United States Patent
Tseng et al.

(10) Patent No.: US 8,165,237 B2
(45) Date of Patent: Apr. 24, 2012

(54) DTMB-BASED CARRIER MODE DETECTION SYSTEM AND RECEIVING SYSTEM HAVING THE SAME

(75) Inventors: Chun-Chieh Tseng, Gueishan Township, Taoyuan County (TW); Wi-Cheng Pu, Sindian (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 569 days.

(21) Appl. No.: 12/453,902

(22) Filed: May 27, 2009

(65) Prior Publication Data

US 2009/0304062 A1    Dec. 10, 2009

(30) Foreign Application Priority Data

Jun. 5, 2008   (TW) .............................. 97120894 A

(51) Int. Cl.
*H04K 1/10* (2006.01)
*H04L 27/28* (2006.01)

(52) U.S. Cl. ...................................................... 375/260
(58) Field of Classification Search .................. 375/260, 375/324, 316, 232
See application file for complete search history.

(56) References Cited

U.S. PATENT DOCUMENTS

| | | | |
|---|---|---|---|
| 2006/0088111 A1* | 4/2006 | Ye et al. | 375/260 |
| 2008/0025424 A1* | 1/2008 | Yang et al. | 375/260 |

* cited by examiner

*Primary Examiner* — Kevin M Burd
*Assistant Examiner* — Wednel Cadeau
(74) *Attorney, Agent, or Firm* — Bacon & Thomas, PLLC

(57) ABSTRACT

A Digital Terrestrial Multimedia Broadcasting (DTMB)-based carrier mode detection system includes first and second TPS decoders, first and second carrier calculators and a determinator. The first and second TPS decoders respectively receive $N_{TPS}$ input signals to thereby produce the corresponding $N_{TPS}$ mask signals and to respectively perform an absolute operation on the corresponding $N_{TPS}$ mask signals to accordingly select a maximum result as first and second absolute maximum mask signals for output. The first and second carrier calculators respectively receive $N_{CS}$ input signals and produce first and second absolute summation carrier signals. The determinator is based on the first absolute maximum mask signal, the first absolute summation carrier signal, the second absolute maximum mask signal and the second absolute summation carrier signal to accordingly determine that the carrier mode is of a multi- or single-carrier mode.

18 Claims, 10 Drawing Sheets

| (S5, S4, S3, S2, S1, S0) | Number | Format | Definition |
|---|---|---|---|
| (X X 0 0 0 0) | 1 | 0001 1110 1010 1110 0100 1000 1011 0011 | First frame indication of odd-number frames |
| ? | 2 | 1110 0001 0101 0001 1011 0111 0100 1100 | First frame indication of even-number frames |
| (X 0 0 1 1 1) | 3 | 0111 1000 1100 1000 0010 0110 1101 0101 | 4QAM NR, LDPC Code Rate 3, Interlaced Mode 1 |
| (X 1 0 1 1 1) | 4 | 1000 0111 0011 0111 1101 1001 0010 1010 | 4QAM NR, LDPC Code Rate 3, Interlaced Mode 2 |
| ⋮ | ⋮ | ⋮ | ⋮ |
| | 6 | | |
| | 7 | | |
| | 8 | | |
| | 9 | | |

FIG. 5

DTMB-BASED CARRIER MODE DETECTION SYSTEM AND RECEIVING SYSTEM HAVING THE SAME

BACKGROUND OF THE INVENTION

1. Field of the Invention

The present invention relates to the technical field of wireless transmission and, more particularly, to a Digital Terrestrial Multimedia Broadcasting (DTMB)-based carrier mode detection system and a receiving system having the same.

2. Description of Related Art

In addition to providing a broadcasting program with better picture and sound qualities, the digital television broadcasting can also provide various data services in comparison with the analog television broadcasting.

With the coming digital epoch, the television broadcasting gradually changes from a conventional analog system to a digital system while the mobile communication is developed from analog systems of the first-generation to voice systems of the second-generation and digital multimedia systems of the third-generation. A digital video broadcasting (DVB) system can overcome the problems of poor receiving quality or unstable signal intensity occurred in the current analog systems and caused by the topographies and the obstacles to thereby provide a broadcasting program with better picture and sound qualities. In addition, the spectral efficiency in the DVB system is increased, and the data amount of programs can be broadcasted more in a limited system bandwidth. More importantly, the DVB can provide various additive services derived from the data broadcasting.

The DVB systems currently proposed by certain nations can be divided into multi- and single-carrier modes. The former mostly uses the Orthogonal Frequency Division Multiplexing (OFDM) modulation technique. The receiving and decoding functions of Transmission Parameter Signaling (TPS) especially play an important role in the digital video broadcasting systems.

As an example of the Terrestrial Digital Video Broadcasting (DVB-T) of European standard, the transmission modes include 2 k and 8 k modes. For the 2 k mode, each OFDM symbol includes 2048 subcarriers, but in application only 1705 subcarriers are used and the remaining ones that are close to two sides of the channel are reserved as a guard band. Among the 1705 subcarriers, only 1512 ones are used to transmit the Quadrature Amplitude Modulation (QAM) signals, and the remaining 193 ones are used to transmit the pilot signals. The pilot signals include 17 TPS pilots, 45 continual pilots and 131 scattered pilots.

Similarly, for the 8 k mode, each OFDM symbol includes 8192 subcarriers, but in application only 6817 ones are active. Only 6048 ones among the 6817 subcarriers are active to transmit the QAM signals, and the remaining 769 ones are active to transmit the pilot signals. The pilot signals include 68 TPS pilots, 177 continual pilots and 524 scattered pilots.

The TPS pilots in the DVB-T system transmit the synchronization signal and the transmission-associated parameters such as coding rates (½, ⅔, ¾, ⅚, ⅞), QAM modulation modes (Quadrature Phase Shift Keying (QPSK), 16-QAM, 64-QAM), guard interval lengths (¼ TU, ⅛ TU, 1/16 TU, 1/32 TU), transmission modes (2 k, 8 k), and the like. Accordingly, the receiver can accurately decode the TPS in advance, so as to ensure that the subsequently received data can be accurately decoded.

US Patent Publication No. 2006/0088111 has disclosed the channel state information (CSI) to help decoding the TPS. As shown in the block diagram of FIG. 1, a Viterbi input processor 76 provides the CSI and outputs the CSI to a TPS decoder 66 for decoding. However, it does not disclose how to use the CSI as well as the input signals to optimize TPS decoding function, how to properly and effectively design the system to obtain the best TPS decoding function with the use of an equalizer, and how to determine a carrier mode.

Therefore, it is desirable to provide an improved carrier mode detection system to mitigate and/or obviate the aforementioned problems.

SUMMARY OF THE INVENTION

The object of the present invention is to provide a Digital Terrestrial Multimedia Broadcasting (DTMB)-based carrier mode detection system and a receiving system having the same, which can obtain the accurate carrier mode information. In addition, the concepts revealed in the proposed carrier mode detection system can be applied to any OFDM-based and related systems.

According to a feature of the invention, a Digital Terrestrial Multimedia Broadcasting (DTMB)-based carrier mode detection system is provided. The system includes a first Transmission Parameter Signaling (TPS) decoder, a first carrier mode calculator, a second TPS decoder, a second carrier mode calculator and a determinator. The first Transmission Parameter Signaling (TPS) decoder receives $N_{TPS}$ frequency domain input signals to thereby produce $N_{TPS}$ first mask signals, and performs an absolute operation on the $N_{TPS}$ first mask signals to accordingly select a maximum result as a first absolute maximum mask signal for output, where $N_{TPS}$ is a positive integer not equal to zero. The first carrier calculator receives $N_{CS}$ frequency domain input signals to thereby calculate a sum of the $N_{CS}$ frequency domain input signals and produce a first summation carrier signal, and performs an absolute operation on the first summation carrier signal to accordingly produce a first absolute summation carrier signal, where $N_{CS}$ is a positive integer not equal to zero. The second TPS decoder receives $N_{TPS}$ time domain input signals to thereby produce $N_{TPS}$ second mask signals, and performs an absolute operation on the $N_{TPS}$ second mask signals to accordingly select a maximum result as a second absolute maximum mask signal for output. The second carrier calculator receives $N_{CS}$ time domain input signals to thereby calculate a sum of the $N_{CS}$ time domain input signals and produce a second summation carrier signal, and performs an absolute operation on the second summation carrier signal to accordingly produce a second absolute summation carrier signal. The determinator is connected to the first TPS decoder, the first carrier calculator, the second TPS decoder and the second carrier calculator in order to determine a carrier mode to be multi- or single-carrier mode based on the first absolute maximum mask signal, the first absolute summation carrier signal, the second absolute maximum mask signal and the second absolute summation carrier signal. Thus, the carrier mode detection which concurrently reads the TPS and the carrier mode indication intensity in frequency and time domains can have a reliable and accurate result.

Other objects, advantages, and novel features of the invention will become more apparent from the following detailed description when taken in conjunction with the accompanying drawings.

BRIEF DESCRIPTION OF THE DRAWINGS

FIG. 5 is a partial table of a DTMB TPS according to the invention;

DETAILED DESCRIPTION OF THE PREFERRED EMBODIMENT

Figure 1:
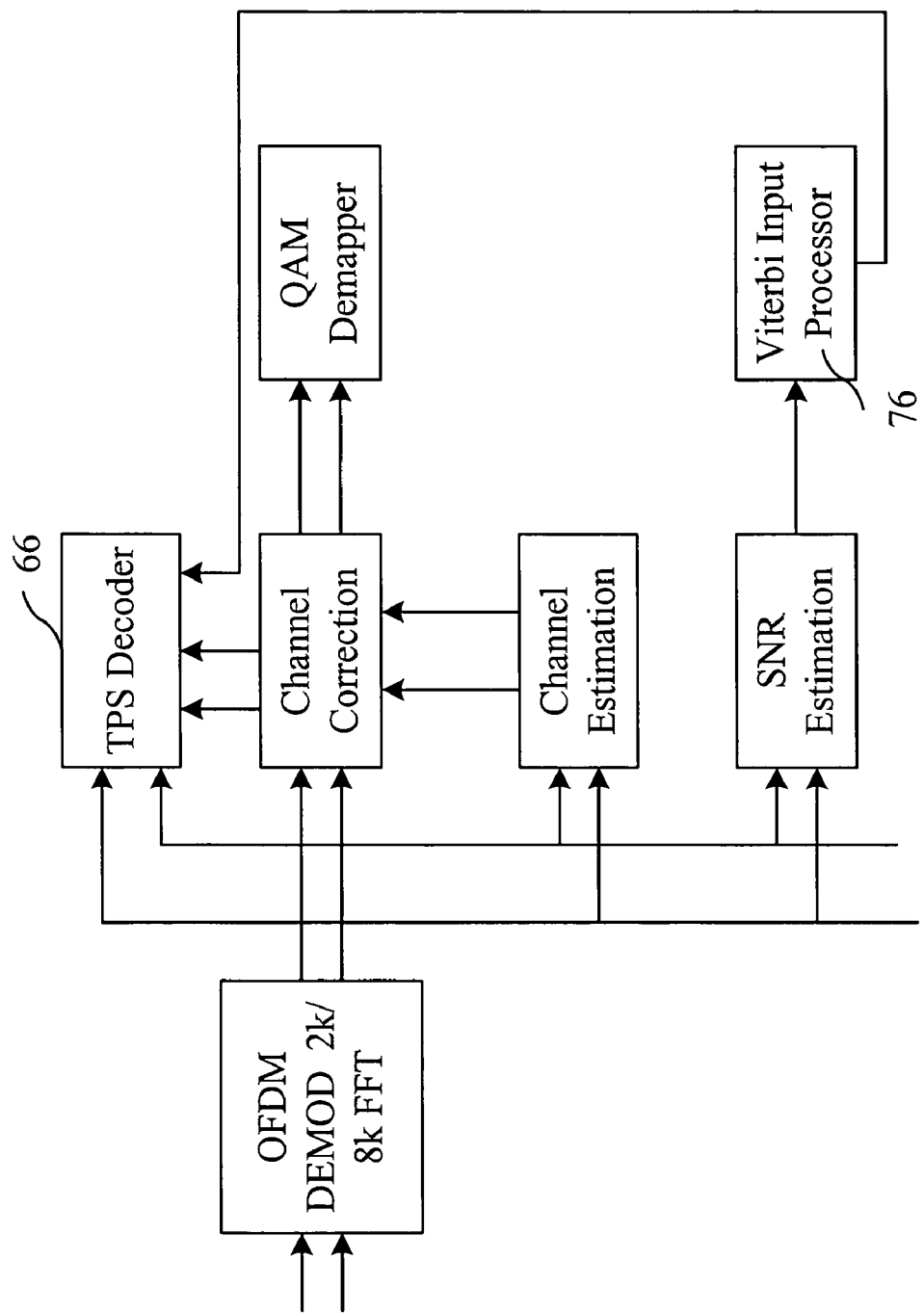
FIG. 1 is a schematic diagram of a typical TPS decoding.
Figure 2:
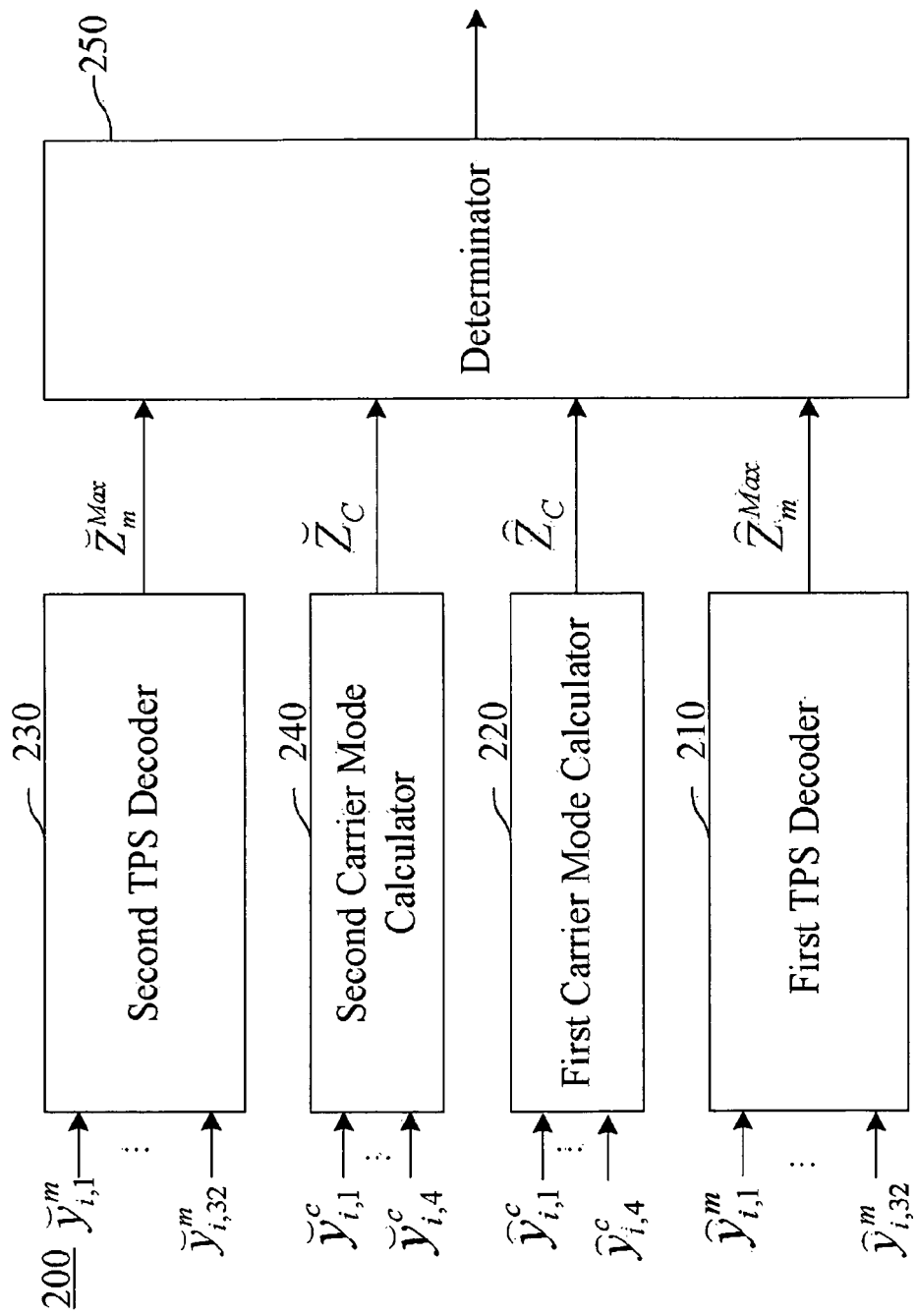
FIG. 2 is a schematic diagram of a DTMB-based carrier mode detection system according to the invention.

FIG. 2 is a schematic diagram of a DTMB-based carrier mode detection system 200 according to the invention. As shown in FIG. 2, the DTMB-based carrier mode detection system 200 includes a first Transmission Parameter Signaling (TPS) decoder 210, a first carrier mode calculator 220, a second TPS decoder 230, a second carrier mode calculator 240 and a determinator 250.

The first Transmission Parameter Signaling (TPS) decoder 210 receives $N_{TPS}$ frequency domain input signals $\hat{y}_{i,k}^m$ to thereby produce $N_{TPS}$ mask signals $\hat{Z}_{q,m}$, and performs an absolute operation on the $N_{TPS}$ mask signals $\hat{Z}_{q,m}$ to accordingly select a maximum result as a first absolute maximum mask signal $\hat{Z}_m^{Max}$ for output, where $N_{TPS}$ is a positive integer. In this case, $N_{TPS}$ is 32 in the DTMB system.

The first carrier calculator 220 receives $N_{CS}$ frequency domain input signals $\hat{y}_{i,k}^c$ to thereby calculate a sum of the $N_{CS}$ frequency domain input signals $\hat{y}_{i,k}^c$ and produce a first summation carrier signal $\hat{y}_{k,sum}^c$, and performs an absolute operation on the first summation carrier signal $\hat{y}_{k,sum}^c$ to accordingly produce a first absolute summation carrier signal $\hat{Z}_c$, where $N_{CS}$ is a positive integer. In this case, $N_{CS}$ is 4 in the DTMB system.

The second TPS decoder 230 receives $N_{TPS}$ time domain input signals $\breve{y}_{i,k}^m$ to thereby produce $N_{TPS}$ mask signals $\breve{Z}_{q,m}$, and performs an absolute operation on the $N_{TPS}$ mask signals $\breve{Z}_{q,m}$ to accordingly select a maximum result as a second absolute maximum mask signal $\breve{Z}_m^{Max}$ for output.

The second carrier calculator 240 receives $N_{CS}$ time domain input signals $\breve{y}_{i,k}^c$ to thereby calculate a sum of the $N_{CS}$ time domain input signals $\breve{y}_{i,k}^c$ and produce a second summation carrier signal $\breve{y}_{k,sum}^c$, and performs an absolute operation on the second summation carrier signal $\breve{y}_{k,sum}^c$ to accordingly produce a second absolute summation carrier signal $\breve{Z}_c$ for output.

The determinator 250 is connected to the first TPS decoder 210, the first carrier mode calculator 220, the second TPS decoder 230 and the second carrier mode calculator 240 in order to determine a carrier mode to be multi-carrier mode or single-carrier mode based on the first absolute maximum mask signal $\hat{Z}_m^{Max}$ and the second absolute maximum mask signal $\breve{Z}_m^{Max}$.

Figure 3:
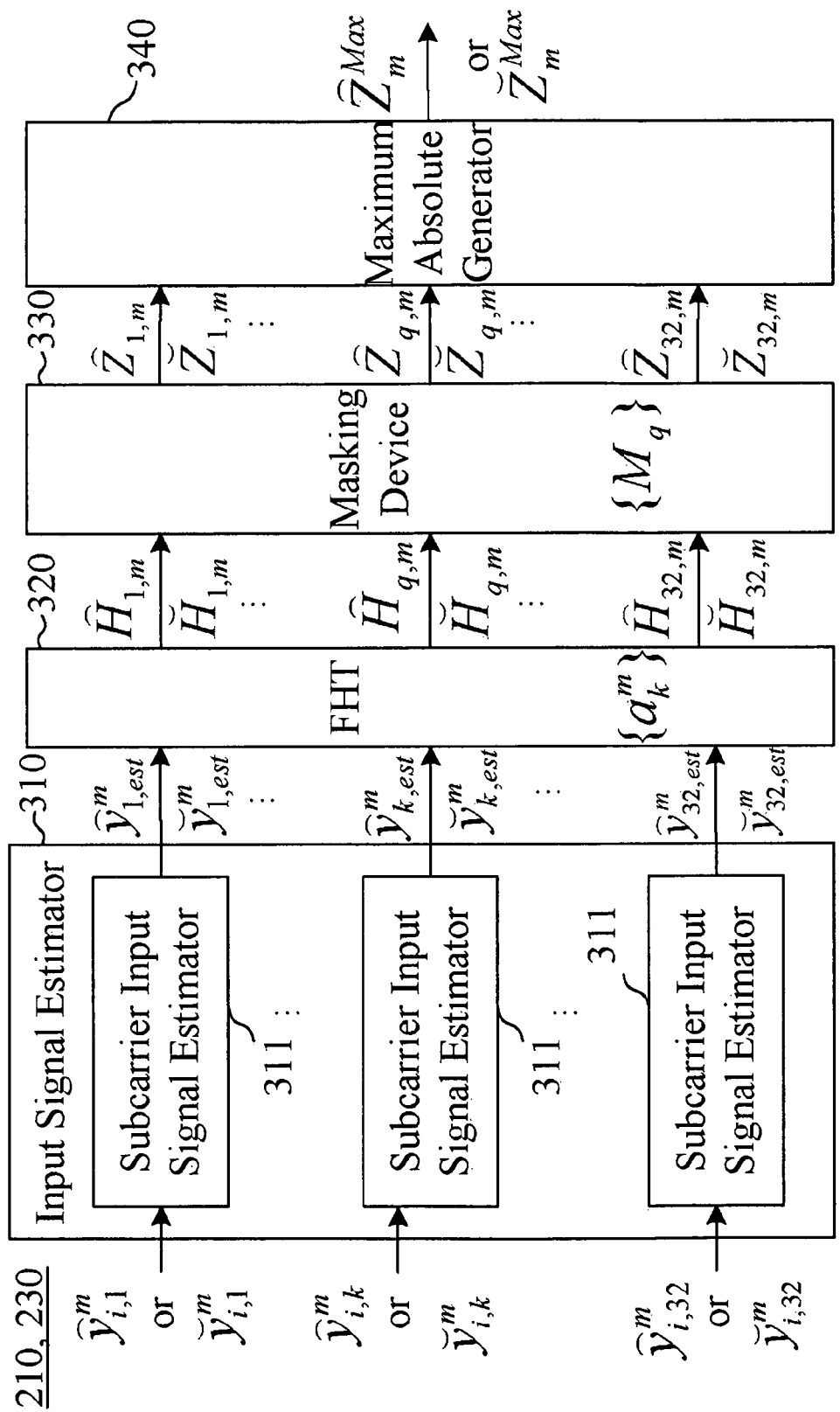
FIG. 3 is a block diagram of a Transmission Parameter Signaling (TPS) decoder according to an embodiment of the invention.

The first TPS decoder 210 and the second TPS decoder 230 have the same hardware configuration. FIG. 3 is a block diagram of the Transmission Parameter Signaling (TPS) decoder according to an embodiment of the invention. The TPS decoder includes an input signal estimator 310, a Fast Hardamard Transform (FHT) device 320, a masking device 330 and a maximum absolute generator 340.

The input signal estimator 310 receives the $N_{TPS}$ input signals $\hat{y}_{i,k}^m$ or $\breve{y}_{i,k}^m$ in order to produce $N_{TPS}$ estimative input signals $\hat{y}_{k,est}^m$ or $\breve{y}_{k,est}^m$, where the $N_{TPS}$ input signals $\hat{y}_{i,k}^m$ or $\breve{y}_{i,k}^m$ indicate the TPS signals of a frame in wireless transmission. Namely, the $N_{TPS}$ frequency domain input signals $\hat{y}_{i,k}^m$ or the $N_{TPS}$ time domain input signals $\breve{y}_{i,k}^m$; indicate the TPS signals of the i-th frame in wireless transmission, where i indicates a frame index, k indicates a subcarrier index and m indicates an available Walsh codeword index. In the DTMB system, $N_{TPS}=32$ and 64 Walsh codewords are availably used (i.e., $N_W=64$). Let k, m be positive integers, $1 \leq k \leq N_{TPS}$ and $1 \leq m \leq N$ and the $N_{TPS}$ frequency domain input signals $\hat{y}_{i,k}^m$ are expressed as a symbol $\hat{Y}_m$ while the $N_{TPS}$ time domain input signals $\breve{y}_{i,k}^m$ are expressed as a symbol $\breve{Y}_m$. Accordingly, we have $\hat{Y}_m = \{\hat{y}_{i,k}^m\}$ and $\breve{Y}_m = \{\breve{y}_{i,k}^m\}$.

Let $X_m = \{x_k^m\}$, where $X_m$ indicates all transmission signals $x_k^m$ transmitted by the $N_{TPS}$ subcarriers, k indicates a subcarrier index and m indicates an available Walsh codeword index.

Figure 4:
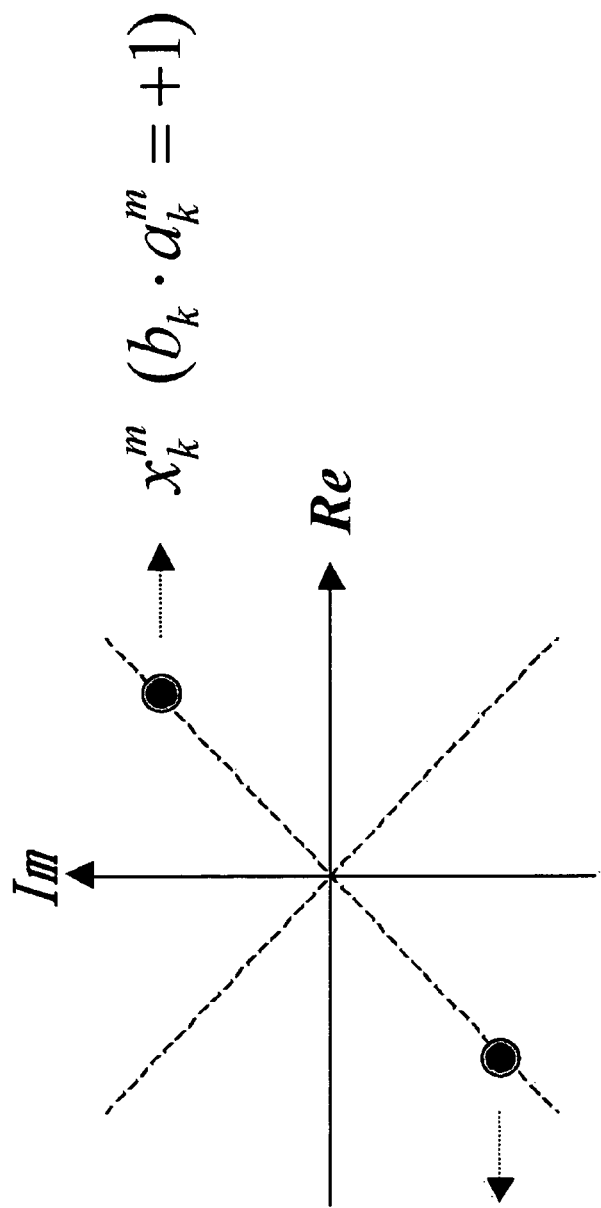
FIG. 4 is a schematic chart of a symbol transmitted by a transmitter of a DTMB digital television system.

FIG. 4 is a schematic chart explaining a symbol $x_k^m$ transmitted by a transmitter of a known DTMB digital television system. As shown in FIG. 4, an original signal is performed with scrambling and Walsh coding, and then a Binary Phase Shift Keying (BPSK) modulation with 45-degree phase shift. Accordingly, the transmission symbol $x_k^m$ can be expressed as:

$$x_k^m = b_k \cdot a_k^m \cdot e^{j\pi/4}, a_k^m = \pm 1, b_k = \pm 1, 1 \leq k \leq 32, \qquad (1)$$

where $a_k^m$ indicates k-th element of a Walsh codeword $A_m$, $b_k$ indicates k-th element of a scramble code set, i.e., $B = \{b_1, b_2, \ldots, b_{32}\}$. In this case, the transmission symbol $x_k^m$ corresponds to the Walsh codeword $A_m$, and the transmission symbol $x_k^m$ at the receiver corresponds to a frequency domain input signal $\hat{y}_{i,k}^m$ or a time domain input signals $\breve{y}_{i,k}^m$. The Walsh codeword $A_m$ indicates an element of a Walsh codeword set W. Namely, $A_m = \{a_1^m, a_2^m, \ldots, a_{32}^m\} \in W$, for $1 \leq m \leq N_W$. The Walsh codeword set W can be expressed as: $\{A_m | 1 \leq m \leq N_W = 64\}$, where $N_W$ indicates the number of elements of the Walsh codeword set W. In this case, we have $N_W = 64$.

Upon the Walsh codeword set W, an active Walsh codeword set $W_A$ is defined as a set of Walsh codewords practically used by the system, i.e., $W_A \subset W$ for $1 \leq n_a \leq N_W$ and $n_a$ indicates the number of elements of the active Walsh codeword set $W_A$. Further, a function $M_q$ is derived from the active Walsh codeword set $W_A$. When $A_q$ belongs to the set $W_A$, $M_q=1$, and otherwise $M_q=0$. The function $M_q$ can be expressed as:

$$M_q = \begin{cases} 1, & A_q \in W_a \\ 0, & A_q \notin W_a. \end{cases} \quad (2)$$

FIG. 5 is a partial table of a known TPS defined in DTMB system. As shown in FIG. 5, the TPS contains 6 bits, and the Walsh codeword set W accordingly contains 64 elements, i.e., $N_W=64$, and $1 \leq m \leq N_W$, where the index m of the Walsh codeword set is a positive integer. The TPS is performed a $b_k$ scrambling operation to thereby produce $N_{TPS}$ bits of data. Due to the BPSK modulation with 45-degree phase shift, a subcarrier can carry one bit of data only. Accordingly, $N_{TPS}$ subcarriers are required. In this case, the subcarrier index k is an integer, for $1 \leq k \leq N_{TPS}$. Since the Walsh codewords in the DTMB system are present in pairs with opposite signs, the detection practically requires first checking the $N_{TPS}$ codewords via Fast Hadamard Transform (FHT) and then picking a codeword according to the sign and index of the most significant value among all FHT outputs.

The input signal estimator 310 includes $N_{TPS}$ subcarrier input signal estimators 311. The input signal estimator 310 uses the $N_{TPS}$ subcarrier input signal estimators 311 to receive the $N_{TPS}$ frequency domain input signals $\hat{y}_{i,k}^m$ or the $N_{TPS}$ time domain input signals $\breve{y}_{i,k}^m$ to thereby produce the $N_{TPS}$ estimative input signals $\hat{y}_{k,est}^m$ or $\breve{y}_{k,est}^m$ respectively.

Figure 6:
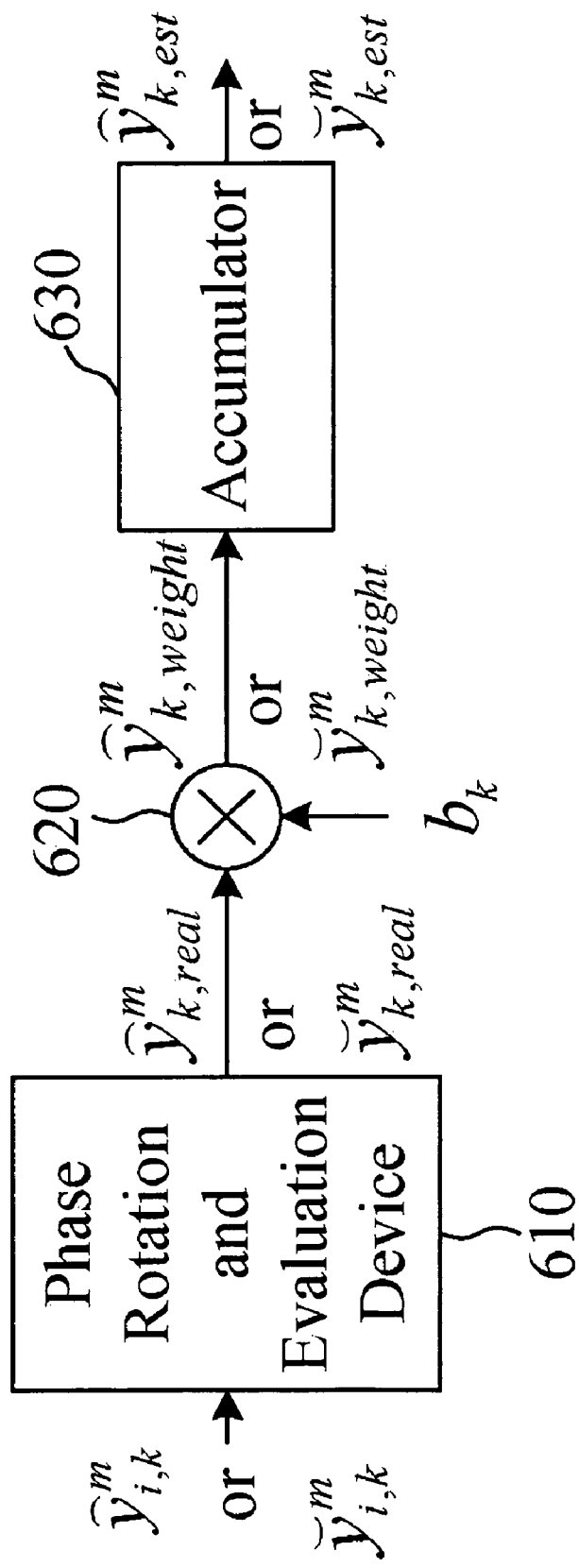
FIG. 6 is a block diagram of a subcarrier input signal estimator according to the invention.

FIG. 6 is a block diagram of a k-th subcarrier input signal estimator 311 according to the invention. As shown in FIG. 6, the k-th subcarrier input signal estimator 311 includes a phase rotation and evaluation device 610, a first weighting device 620 and an accumulator 630.

The phase rotation and evaluation device 610 receives an input signal $\hat{y}_{i,k}^m$ or $\breve{y}_{i,k}^m$ and performs an 45-degree inverse phase rotation on the input signal $\hat{y}_{i,k}^m$ or $\breve{y}_{i,k}^m$ in order to take the real part to thereby produce a real number input signal $\hat{y}_{k,real}^m$ or $\breve{y}_{k,real}^m$.

The first weighting device 620 is connected to the first weighting device 610 in order to perform a weighting operation on the real number input signal $\hat{y}_{k,real}^m$ or $\breve{y}_{k,real}^m$ based on a first weight factor $b_k$ to thereby produce a first weight input signal $\hat{y}_{k,weight}^m$ or $\breve{y}_{k,weight}^m$. The first weighting device 620 preferably is a multiplier.

The accumulator 630 is connected to the first weighting device 620 in order to accumulate the first weight input signal $\hat{y}_{k,weight}^m$ or $\breve{y}_{k,weight}^m$ respectively of a plurality of successive frames to thereby produce an estimative input signal $\hat{y}_{k,est}^m$ or $\breve{y}_{k,est}^m$. Thus, each of the subcarrier input signal estimators 311 has an estimative input signal $\hat{y}_{k,est}^m$ or $\breve{y}_{k,est}^m$, as shown in FIG. 3.

Figure 7:
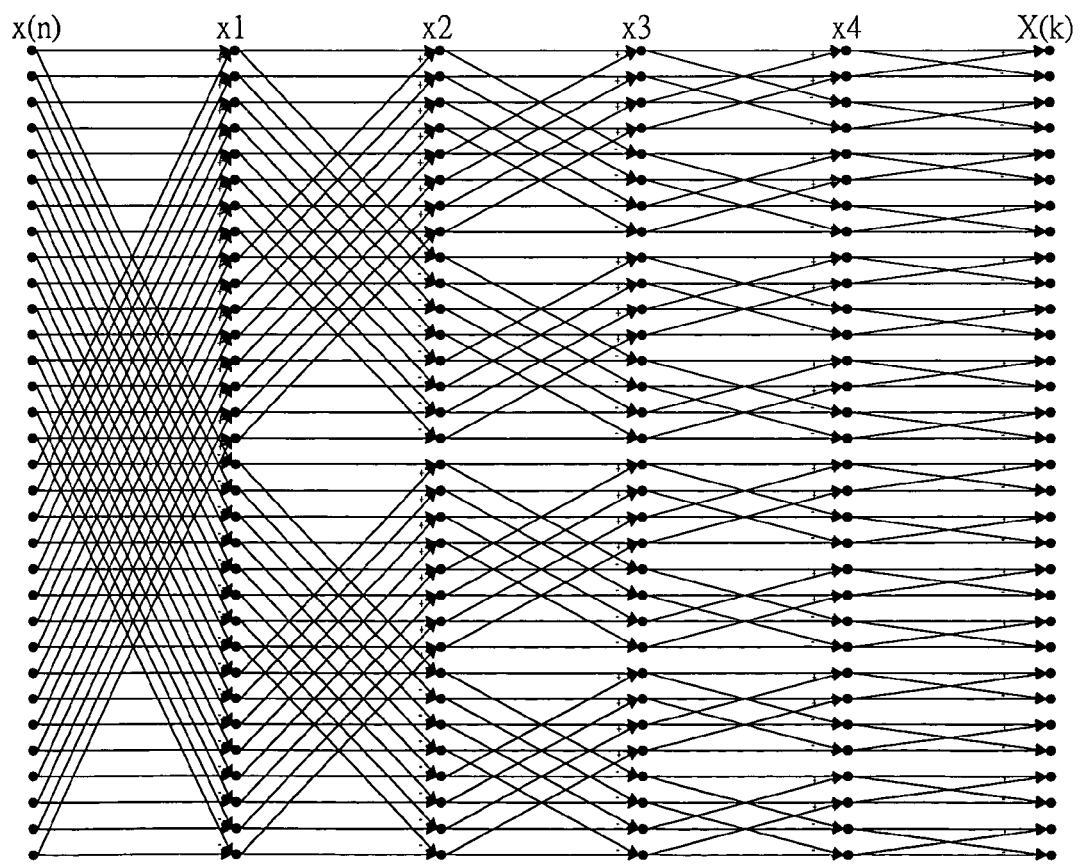
FIG. 7 is a schematic chart of a Fast Hadamard Transform device according to the invention.

Referring again to FIG. 3, the FHT device 320 is connected to the input signal estimator 310 in order to perform a Fast Hadamard Transform (FHT) operation respectively on the $N_{TPS}$ estimative input signals $\hat{y}_{k,est}^m$ or $\breve{y}_{k,est}^m$ to thereby produce $N_{TPS}$ Hadamard transform signals $\hat{H}_{q,m}$ or $\breve{H}_{q,m}$. FIG. 7 is a schematic chart of the Fast Hadamard Transform (FHT) device 320 according to the invention. The FHT device 320 is based on Equation (3) as follows to perform the FHT operation respectively on the $N_{TPS}$ estimative input signals $\hat{y}_{k,est}^m$ or $\breve{y}_{k,est}^m$ to thereby produce the $N_{TPS}$ Hadamard transform signals $\hat{H}_{q,m}$ or $\breve{H}_{q,m}$. Equation (3) can be expressed as:

$$\hat{H}_{q,m} = \sum_k a_k^q \hat{y}_{k,est}^m \text{ or } \breve{H}_{q,m} = \sum_k a_k^q \breve{y}_{k,est}^m, \quad (3)$$

where $\hat{y}_{k,est}^m$ or $\breve{y}_{k,est}^m$ indicates the $N_{TPS}$ estimative input signals, $\hat{H}_{q,m}$ or $\breve{H}_{q,m}$ indicates the $N_{TPS}$ Hadamard transform signals, and $a_k^q$ indicates k-th element of a Walsh codeword $A_q$, for $q=1, \ldots, 32$.

The masking device 330 is connected to the FHT device 320 in order to perform a masking operation respectively on the $N_{TPS}$ Hadamard transform signals $\hat{H}_{q,m}$ or $\breve{H}_{q,m}$ to thereby produce the $N_{TPS}$ mask signals $\hat{Z}_{q,m}$ or $\breve{Z}_{q,m}$.

The masking device 330 is based on Equation (4) to perform the masking operation respectively on the $N_{TPS}$ Hadamard transform signals $\hat{H}_{q,m}$ or $\breve{H}_{q,m}$ to thereby produce the $N_{TPS}$ mask signals $\hat{Z}_{q,m}$ or $\breve{Z}_{q,m}$. Equation (4) can be expressed as:

$$\hat{Z}_{q,m=M_q} \cdot \hat{H}_{q,m} \text{ or } \breve{Z}_{q,m=M_q} \cdot \breve{H}_{q,m} \quad (4)$$

When the codeword corresponding to the $N_{TPS}$ input signals in transmission belongs to the active Walsh codeword set $W_A$, we have $M_q=1$. When the codeword corresponding to the $N_{TPS}$ input signals in transmission does not belong to the active Walsh codeword set $W_A$, we have $M_q=0$.

The maximum absolute generator 340 is connected to the masking device 330 in order to perform an absolute operation respectively on the $N_{TPS}$ mask signals $\hat{Z}_{q,m}$ or $\breve{Z}_{q,m}$ and accordingly select a maximum result to thereby produce the first absolute maximum mask signal $\hat{Z}_m^{Max}$ for the first TPS decoder 210 or the second absolute maximum mask signal $\breve{Z}_m^{Max}$ for the second TPS decoder 230.

The maximum absolute generator 340 produces the first absolute maximum mask signal $\hat{Z}_m^{Max}$ or the second absolute maximum mask signal $\breve{Z}_m^{Max}$ based on an equation as follows.

$$\hat{Z}_m^{Max} = \max_{A_q \in W} \left| \hat{Z}_{q,m} \right| \text{ or } \breve{Z}_m^{Max} = \max_{A_q \in W} \left| \breve{Z}_{q,m} \right|, \quad (5)$$

where $\hat{Z}_{q,m}$ or $\breve{Z}_{q,m}$ indicates the $N_{TPS}$ mask signals, W indicates a Walsh codeword set corresponding to the active Walsh codeword set $W_A$, $A_q$ indicates a codeword of the Walsh codeword set W, $\hat{Z}_m^{Max}$ indicates a maximum one among the $N_{TPS}$ mask signals $\hat{Z}_{q,m}$, and $\breve{Z}_m^{Max}$ indicates a maximum one among the $N_{TPS}$ mask signals $\breve{Z}_{q,m}$.

Figure 8:
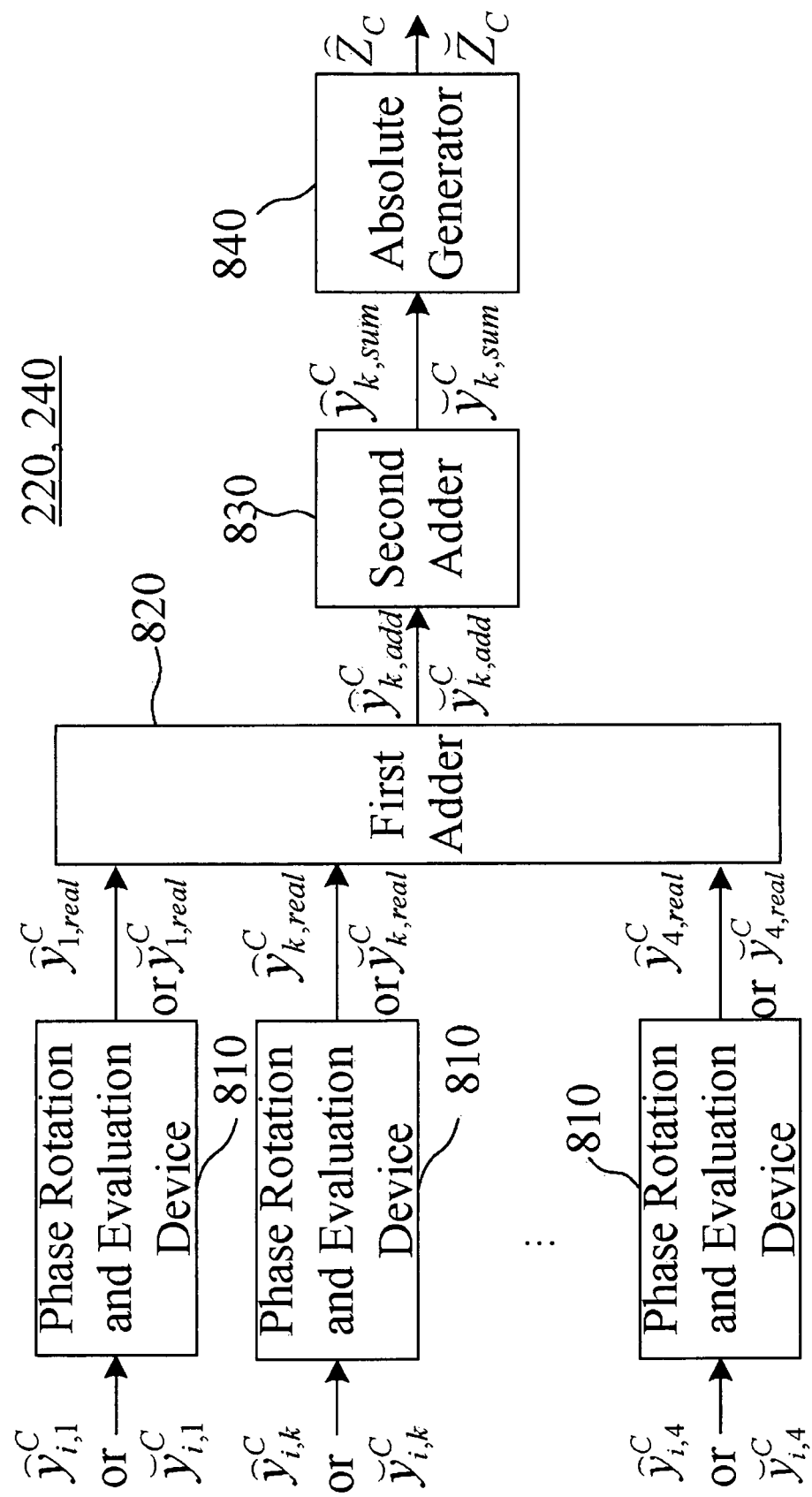
FIG. 8 is a block diagram of a carrier mode calculator according to the invention.

The first carrier mode calculator 220 and the second carrier mode calculator 240 have the same hardware configuration. FIG. 8 is a block diagram of the carrier mode calculator according to the invention. As shown in FIG. 8, the carrier mode calculator includes $N_{CS}$ phase rotation and evaluation devices 810, a first adder 820, a second adder 830 and an absolute generator 840, where $N_{CS}$ is a positive integer. In the DTMB system, $N_{CS}=4$.

The DTMB system uses a single carrier or multiple carriers to transmit the messages. When the TPS is transmitted, an $N_{CS}$-bit mode indication signal, which corresponds to $N_{CS}$ time domain input signals $\tilde{y}_{i,k}^c$ or $N_{CS}$ frequency domain input signals $\hat{y}_{i,k}^c$, is also transmitted, thereby indicating that the TPS is transmitted by the transmitter in a single- or multi-carrier mode. When the TPS is transmitted by the transmitter in the single-carrier mode, the content of the mode indication signal is '0000' in binary. When the TPS is transmitted by the transmitter in the multi-carrier mode, the content of the mode indication signal is '1111' in binary. Next, a BPSK symbol mapping is performed to change '0' into '1' and '1' into '−1'. Namely, when the receiver receives the mode indication signal with N Cs in number on '1', it indicates a single-carrier mode transmission, and when the receiver receives the mode indication signal with $N_{CS}$ in number on '−1', it indicates a multi-carrier mode transmission.

The $N_{CS}$ phase rotation and evaluation devices 810 receive the $N_{CS}$ input signals $\tilde{y}_{i,k}^c$ or $\hat{y}_{i,k}^c$ and perform the 45-degree inverse phase rotation on the $N_{CS}$ input signals $\hat{y}_{i,k}^c$ or $\tilde{y}_{i,k}^c$ in order to take the real part to thereby produce a real number input signal $\hat{y}_{k,real}^c$ or $\tilde{y}_{k,real}^c$ respectively.

The first adder 820 is connected to the $N_{CS}$ phase rotation and evaluation devices 810 in order to calculate a sum of the real number input signals $\hat{y}_{k,real}^c$ or $\tilde{y}_{k,real}^c$ to thereby produce an addition input signal $\hat{y}_{k,add}^c$ or $\tilde{y}_{k,add}^c$.

The second adder 830 is connected to the first adder 820 in order to accumulate the addition input signals $\hat{y}_{k,add}^c$ or $\tilde{y}_{k,add}^c$ of a plurality of successive frames to thereby produce a summation carrier signal $\hat{y}_{k,sum}^c$ or $\tilde{y}_{k,sum}^c$.

The absolute generator 840 is connected to the second adder 830 in order to perform an absolute operation on the summation carrier signal $\hat{y}_{k,sum}^c$ or $\tilde{y}_{k,sum}^c$ to thereby produce the first absolute summation carrier signal $\hat{Z}_c$ for the first carrier calculator 220 or the second absolute summation carrier signal $\tilde{Z}_c$ for the second carrier calculator 240.

Figure 9:
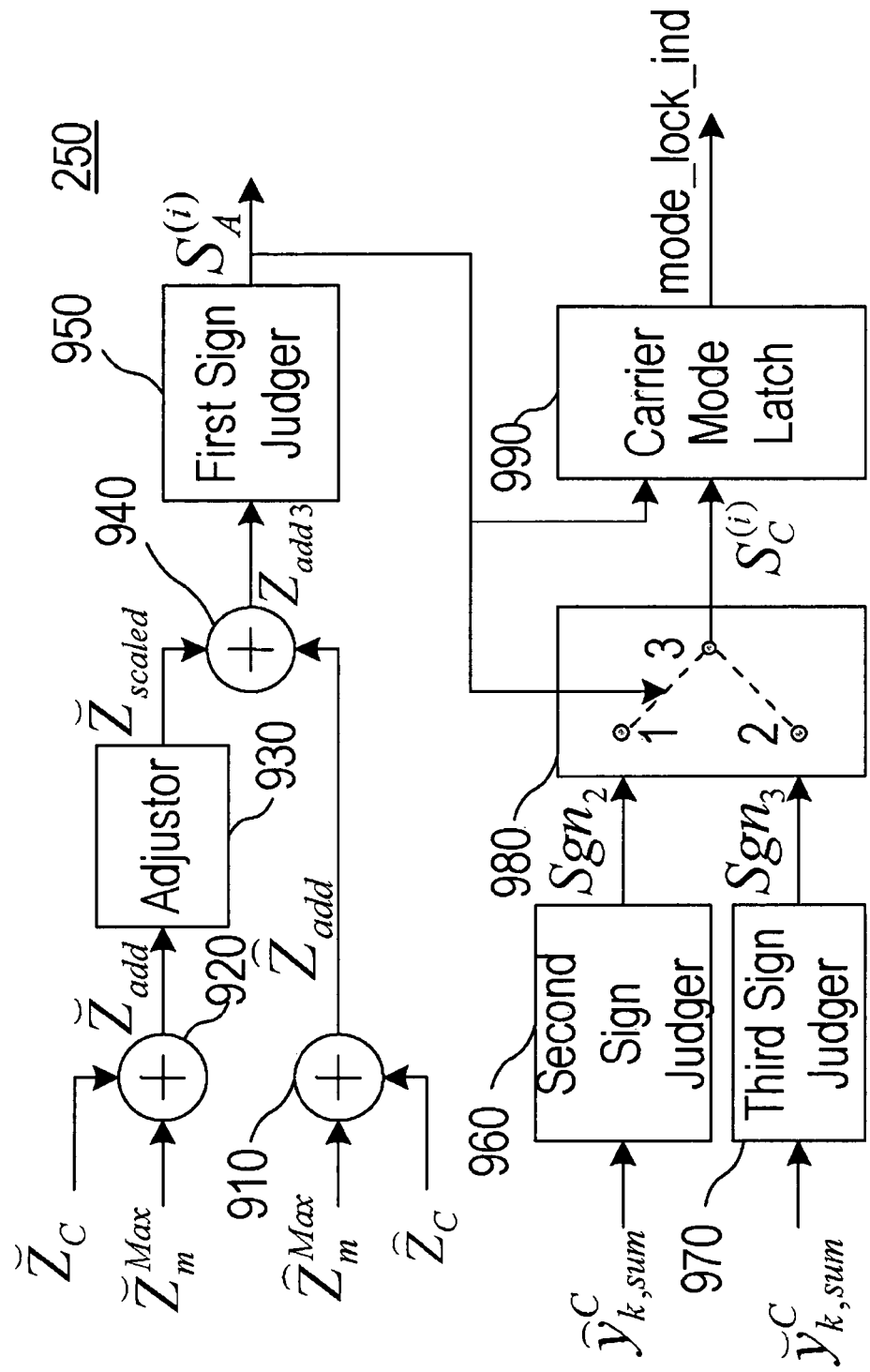
FIG. 9 is a block diagram of a determinator according to the invention.

FIG. 9 is a block diagram of the determinator 250 according to the invention. In FIG. 9, the determinator 250 includes a first adder 910, a second adder 920, an adjustor 930, a third adder 940, a first sign judger 950, a second sign judger 960, a third sign judger 970, a selector 980 and a carrier mode latch 990.

The first adder 910 receives the first absolute maximum mask signal $\hat{Z}_m^{Max}$ and the first absolute summation carrier signal $\hat{Z}_c$ to thereby produce a first addition signal $\hat{Z}_{add}$. The second adder 920 receives the second absolute maximum mask signal $\tilde{Z}_m^{Max}$ and the second absolute summation carrier signal $\tilde{Z}_c$ to thereby produce a second addition signal $\tilde{Z}_{add}$.

The adjustor 930 is connected to the second adder 920 in order to adjust the second addition signal $\tilde{Z}_{add}$ to thereby produce an adjustment addition signal $\tilde{Z}_{scaled}$.

The third adder 940 is connected to the first adder 910 and the adjuster 930 in order to add the first addition signal $\hat{Z}_{add}$ and the adjustment addition signal $\tilde{Z}_{scaled}$ to thereby a third addition signal $Z_{add3}$.

The first sign judger 950 is connected to the third adder 940 in order to output a first sign signal $S_A^{(i)}$ based on the third addition signal $Z_{add3}$ and accordingly judge the carrier mode to be the multi- or single-carrier mode, wherein i indicates that the first sign signal $S_A^{(i)}$ is corresponding to Frame i.

When the third addition signal $Z_{add3}$ is greater than zero, the first sign signal $S_A^{(i)}$ has a positive sign, and the carrier mode is the single-carrier mode. When the third addition signal $Z_{add3}$ is not greater than zero, the first sign signal $S_A^{(i)}$ has not a positive sign, and the carrier mode is the multi-carrier mode.

The second sign judger 960 is connected to the first carrier calculator 220 in order to output a second sign signal $Sgn_2$ based on the first summation carrier signal $\hat{y}_{k,sum}^c$.

The third sign judger 970 is connected to the second carrier calculator 240 in order to output a third sign signal $Sgn_3$ based on the second summation carrier signal $\tilde{y}_{k,sum}^c$.

The selector 980 is connected to the first to third judgers 950 to 970 in order to select the third sign signal $Sgn_3$ as a fourth sign signal $S_C^{(i)}$ for output when the first sign signal $S_A^{(i)}$ has the positive sign, and otherwise select the second sign signal $Sgn_2$ as the fourth sign signal $S_C^{(i)}$ for output, wherein i indicates that the fourth sign signal $S_C^{(i)}$ corresponds to Frame i.

The carrier mode latch 990 is connected to the selector 980 and the first sign judger 950 in order to produce a mode lock indication signal mode_lock_ind and lock the carrier mode at the single-carrier mode when the first sign signal $S_A^{(i)}$ and the fourth sign signal $S_C^{(i)}$ have the positive sign and a frame number $N_S$ is over a first threshold.

In addition, when the first sign signal $S_A^{(i)}$ and the fourth sign signal $S_C^{(i)}$ have a negative sign and the frame number Ns is over the first threshold, the carrier mode latch 990 produces the mode lock indication signal mode_lock_ind and locks the carrier mode at the multi-carrier mode.

In other embodiments, when the first sign signal $S_A^{(i)}$ and the fourth sign signal $S_C^{(i)}$ have the positive sign, the first sign signals $S_A^{(i)}$ of Frame i and Frame (i−1) have a same sign, and the frame number Ns is over the first threshold, the carrier mode latch 990 produces the mode lock indication signal mode_lock_ind and locks the carrier mode at the single-carrier mode. When the first sign signal $S_A^{(i)}$ and the fourth sign signal $S_C^{(i)}$ have the negative sign, the first sign signals $S_A^{(i)}$ of Frame i and Frame (i−1) have the same sign, and the frame number $N_S$ is over the first threshold, the carrier mode latch 990 produces the mode lock indication signal mode_lock_ind and locks the carrier mode at the multi-carrier mode.

Figure 10:
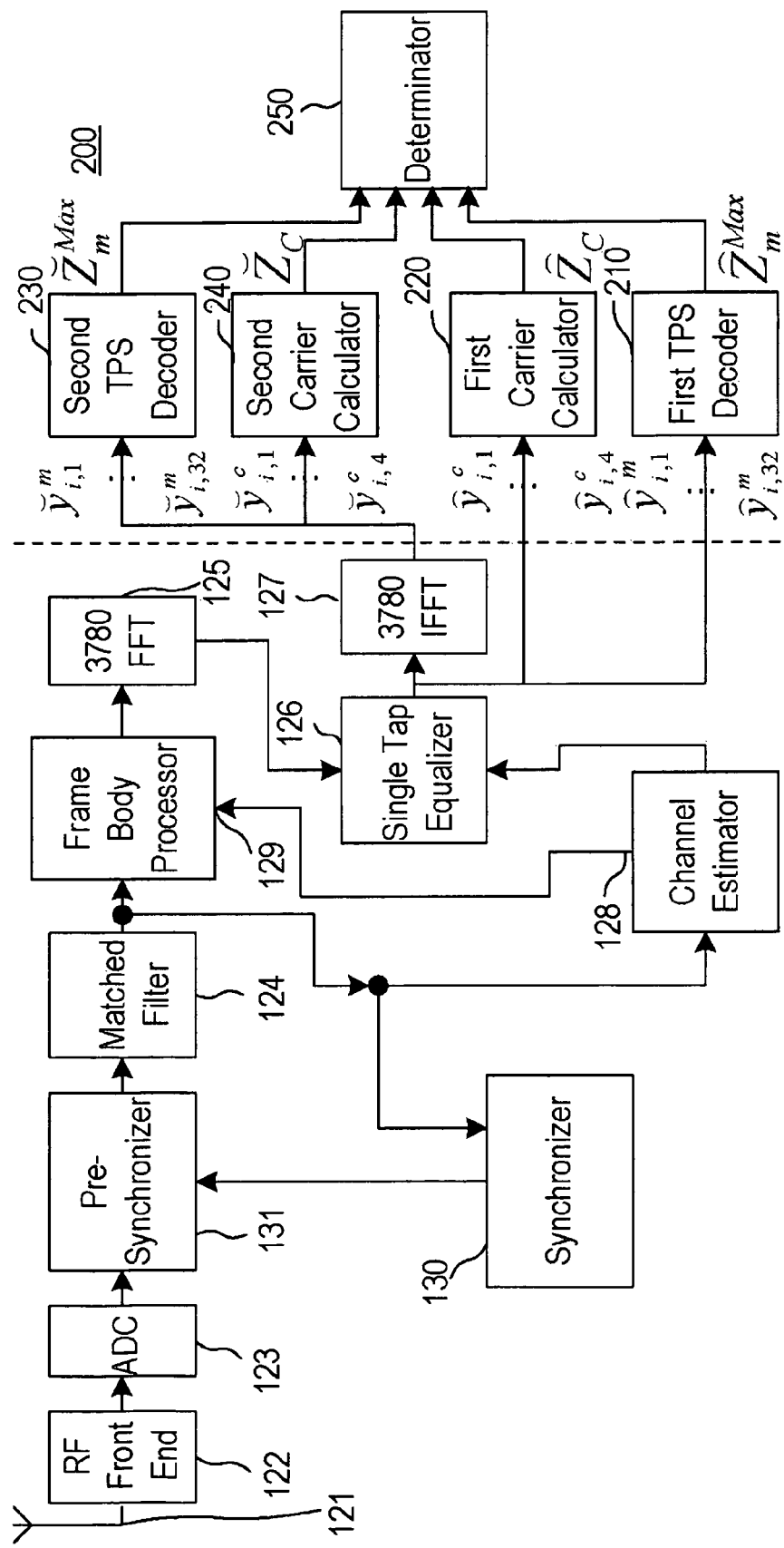
FIG. 10 is a block diagram of a DTMB-based carrier mode detection system applied to a receiver of a DTMB digital television system according to the invention.

FIG. 10 is a block diagram of the DTMB-based carrier mode detection system 200 applied to a receiver of a DTMB digital television system according to the invention. As shown in FIG. 10, the DTMB-based carrier mode detection system 200 is shown at the right side of the dotted line, and the receiver of the DTMB digital television system is shown at the left side of the dotted line. The receiver includes an antenna 121, a radio frequency (RF) front end 122, an analog to digital converter (ADC) 123, a pre-synchronizer 131, a matched filter 124, a frame body processor 129, a synchronizer 130, a 3780-dot Fast Fourier Transform (FFT) 125, a single tap equalizer 126, a 3780-dot inverse Fast Fourier Transform (IFFT) 127 and a channel estimator 128.

The antenna 121 receives a radio signal. The RF front end 122 reduces the radio signal from a radio frequency down to a baseband to thereby produce a baseband signal. The ADC 123 performs an analog to digital conversion on the baseband signal. The filter 124 performs a filtering to thereby filter outband noises. The pre-synchronizer 131 connected to the ADC 123 for compensating the ppm offset estimated by the synchronizer 130. Typically speaking, the pre-synchronizer 131 consists of a digital mixer followed by an interpolator (not shown in figure). The former compensates frequency offset and the latter compensates timing offset. The synchronizer 130 is connected to an output of the filter for system synchronization. The channel estimator 128 is also connected to the matched filter for a channel measurement to thereby produce channel measure signals $\{\hat{H}_{i,k}\}$. The frame body processor 129 is based on the channel measure signals produced by the channel estimator 128 to process a frame body, which includes eliminating the interference introduced by frame header and acquires frame body for the followed FFT operation based on timing information provided by synchronizer 130. The 3780-dot FFT 125 performs an FFT operation on an output of the frame body processor 129 to thereby produce the frequency domain input signals $\{y_{i,k}^m\}$. The single tap equalizer 126 is based on the channel measure signals $\{\hat{H}_{i,k}\}$ to perform a zero-forcing equalization processing on the frequency domain input signals $\{y_{i,k}^m\}$ to thereby produce the frequency domain input signals $\hat{y}_{i,k}^m$ or $\hat{y}_{i,k}^c$ used in the system 200. The 3780-dot IFFT 127 performs an IFFT operation on the frequency domain input signals $\hat{y}_{i,k}^m$ or $\hat{y}_{i,k}^c$ to thereby produce the time domain input signals $\breve{y}_{i,k}^m$ or $\breve{y}_{i,k}^c$ used in the system 200.

The TPS in the DTMB system is transmitted either at single-carrier or multi-carrier modes. In this case, the invention uses the first TPS decoder 210 and the second TPS decoder 230 to determine the TPS input signals to be transmitted in frequency or time domain. When the TPS input signals are transmitted in frequency domain, the first absolute maximum mask signal $\hat{Z}_m^{Max}$ output by the first TPS decoder 210 is greater than the second absolute maximum mask signal $\breve{Z}_m^{Max}$ output by the second TPS decoder 230. When the TPS input signals are transmitted in frequency domain, the second absolute maximum mask signal $\breve{Z}_m^{Max}$ output by the second TPS decoder 230 is greater than the first absolute maximum mask signal $\hat{Z}_m^{Max}$ output by the first TPS decoder 210. In addition, in order to increase the determination reliability, the magnitude relationship between the absolute summation carrier signals $\hat{Z}_c$ or $\breve{Z}_c$ produced by the first carrier mode calculator 220 and the second carrier mode calculator 240 are taken into consideration.

As cited, the prior art does not disclose how the carrier mode detection system can obtain an accurate carrier mode in transmission in the DTMB system. Accordingly, the invention uses the amplitude and strength of the TPS signals decoded in frequency domain and time domain to judge the carrier mode, and further uses the help of the amplitude of the mode indication signal to increase the reliability.

Although the present invention has been explained in relation to its preferred embodiment, it is to be understood that many other possible modifications and variations can be made without departing from the spirit and scope of the invention as hereinafter claimed.

What is claimed is:

1. A Digital Terrestrial Multimedia Broadcasting (DTMB)-based carrier mode detection system, comprising:
    a first Transmission Parameter Signaling (TPS) decoder, for receiving M frequency domain input signals to produce M first mask signals, and performing an absolute operation on the M first mask signals to select a maximum result as a first absolute maximum mask signal for output, where M is a positive integer;
    a first carrier mode calculator, for receiving N frequency domain input signals to calculate a sum of the N frequency domain input signals and produce a first summation carrier signal, and performing the absolute operation on the first summation carrier signal to produce a first absolute summation carrier signal, where N is a positive integer;
    a second TPS decoder, for receiving M time domain input signals to produce M second mask signals, and performing the absolute operation on the M second mask signals to select a maximum result as a second absolute maximum mask signal for output;
    a second carrier mode calculator for receiving N time domain input signals to calculate a sum of the N time domain input signals and produce a second summation carrier signal, and performing the absolute operation on the second summation carrier signal to produce a second absolute summation carrier signal; and
    a determinator, connected to the first TPS decoder, the first carrier calculator, the second TPS decoder and the second carrier calculator, for determining a carrier mode to be multi-carrier mode or single-carrier mode based on the first absolute maximum mask signal, the first absolute summation carrier signal, the second absolute maximum mask signal and the second absolute summation carrier signal.

2. The detection system as claimed in claim 1, wherein the determinator comprises:
    a first adder, for receiving the first absolute maximum mask signal and the first absolute summation carrier signal to produce a first addition signal;
    a second adder, for receiving the second absolute maximum mask signal and the second absolute summation carrier signal to produce a second addition signal;
    an adjustor, connected to the second adder, for adjusting the second addition signal to produce an adjustment addition signal;
    a third adder, connected to the first adder and the adjuster for adding the first addition signal and the adjustment addition signal to produce a third addition signal; and
    a first sign judger, connected to the third adder, for outputting a first sign signal based on the third addition signal to thereby judge the carrier mode to be the multi-carrier mode or the single-carrier mode.

3. The detection system as claimed in claim 2, wherein the carrier mode is the single-carrier mode when the first sign signal is a positive sign, otherwise the carrier mode is the multi-carrier mode.

4. The detection system as claimed in claim 2, wherein the determinator further comprises:
    a second sign judger, connected to the first carrier calculator, for outputting a second sign signal based on the first summation carrier signal;
    a third sign judger, connected to the second carrier calculator, for outputting a third sign signal based on the second summation carrier signal; and
    a selector, connected to the first to third judgers, for selecting the third sign signal as a fourth sign signal for output when the first sign signal is the positive sign, and otherwise selecting the second sign signal as the fourth sign signal.

5. The detection system as claimed in claim 4, wherein the determinator further comprises a carrier mode latch, connected to the selector and the first sign judger, for producing a mode lock indication signal and locking the carrier mode at the single-carrier mode when the first sign signal and the fourth sign signal are the positive sign and a frame number is over a first threshold.

6. The detection system as claimed in claim 5, wherein the carrier mode latch produces the mode lock indication signal and locks the carrier mode at the multi-carrier mode when the first sign signal and the fourth sign signal are negative sign and the frame number is over the first threshold.

7. The detection system as claimed in claim 1, wherein the first TPS decoder comprises:
an input signal estimator, for receiving the M frequency domain input signals to produce M estimative input signals, where the M frequency domain input signals indicate TPS signals of a frame in wireless transmission;
a Fast Hadamard Transform (FHT) device, connected to the input signal estimator, for performing a Fast Hadamard Transform (FHT) operation respectively on the M estimative input signals to produce M Hardamard transform signals;
a masking device, connected to the FHT device, for performing a masking operation respectively on the M Hardamard transform signals to produce the M first mask signals; and
a maximum absolute generator, connected to the masking device, for performing the absolute operation respectively on the M first mask signals and selecting the maximum result to produce the first absolute maximum mask signal.

8. The detection system as claimed in claim 7, wherein the FHT device performing the FHT operation respectively on the M estimative input signals to correspondingly produce M Hardamard transform signals is based on an equation as follows:

$$\hat{H}_{q,m} = \sum_k a_k^q \hat{y}_{k,est}^m,$$

where $\hat{y}_{k,est}^m$ indicates the M estimative input signals, $\hat{H}_{q,m}$ indicates the M Hardamard transform signals, and $a_k^q$ indicates a codeword corresponding to the M frequency domain input signals, for q=1, . . . , 32.

9. The detection system as claimed in claim 8, wherein the masking device performing the masking operation respectively on the M Hardamard transform signals to produce the M first mask signals is based on an equation as follows:

$$\hat{Z}_{q,m} = M_q \cdot \hat{H}_{q,m},$$

where $\hat{Z}_{q,m}$ indicates the M first mask signals, and $M_q=1$ when the codeword corresponding to the M frequency domain input signals belongs to an active Walsh codeword set and conversely $M_q=0$.

10. The detection system as claimed in claim 9, wherein the maximum absolute generator producing the first absolute maximum mask signal is based on an equation as follows:

$$\hat{Z}_m^{Max} = \underset{A_q \in W}{\text{Max}} |\hat{Z}_{q,m}|,$$

where $\hat{Z}_{q,m}$ indicates the M first mask signals, W indicates a Walsh codeword set corresponding to the active Walsh codeword set, $A_q$ indicates a codeword of the Walsh codeword set, and $\hat{Z}_m^{Max}$ indicates a maximum one among the M first mask signals $\hat{Z}_{q,m}$.

11. The detection system as claimed in claim 7, wherein the input signal estimator comprises M subcarrier input signal estimators in which a k-th subcarrier input signal estimator includes:
a phase rotation and evaluation device, which receives the k-th frequency domain input signal and performs a 45-degree inverse phase rotation on the k-th frequency domain input signal in order to take the real part to thereby produce a real number input signal;
a first weighting device, connected to the first weighting device, for performing a weighting operation on the real number input signal based on a first weight factor to produce a first weight input signal; and
an accumulator, connected to the first weighting device, for accumulating the first weight input signal respectively of a plurality of successive frames to produce the k-th estimative input signal, for $1 \leq k \leq M$.

12. The detection system as claimed in claim 1, wherein the second TPS decoder comprises:
an input signal estimator, for receiving the M time domain input signals to produce M estimative input signals, where the M time domain input signals indicate TPS signals of a frame in wireless transmission;
a Fast Hadamard Transform (FHT) device, connected to the input signal estimator for performing a Fast Hadamard Transform (FHT) operation respectively on the M estimative input signals to correspondingly produce M Hardamard transform signals;
a masking device, connected to the FHT device, for performing a masking operation respectively on the M Hardamard transform signals to produce the M second mask signals; and
a maximum absolute generator, connected to the masking device, for performing the absolute operation respectively on the M second mask signals and selecting a maximum result to produce the second absolute maximum mask signal.

13. The detection system as claimed in claim 12, wherein the FHT device performing the FHT operation respectively on the M estimative input signals to correspondingly produce M Hardamard transform signals is based on an equation as follows:

$$\hat{H}_{q,m} = \sum_k a_k^q \hat{y}_{k,est}^m,$$

where $\hat{y}_{k,est}^m$ indicates the M estimative input signals, $\hat{H}_{q,m}$ indicates the M Hardamard transform signals, and $a_k^q$ indicates a codeword corresponding to the M time domain input signals, for q=1, . . . , 32.

14. The detection system as claimed in claim 13, wherein the masking device performing the masking operation respectively on the M Hardamard transform signals to produce the M second mask signals is based on an equation as follows:

$$\hat{Z}_{q,m} = M_q \cdot \hat{H}_{q,m},$$

where $\hat{Z}_{q,m}$ indicates the M second mask signals, and $M_q=1$ when the codeword corresponding to the M time domain input signals in transmission belongs to an active Walsh codeword set, otherwise $M_q=0$.

15. The detection system as claimed in claim 14, wherein the maximum absolute generator producing the second absolute maximum mask signal is based on an equation as follows:

$$\hat{Z}_m^{Max} = \underset{A_q \in W}{\text{Max}} \left| \hat{Z}_{q,m} \right|,$$

where $\hat{Z}_{q,m}$ indicates the M second mask signals, W indicates a Walsh codeword set corresponding to the active Walsh codeword set, $A_q$ indicates a codeword of the Walsh codeword set, and $\hat{Z}_m^{Max}$ indicates a maximum one among the M second mask signals $\hat{Z}_{q,m}$.

16. The detection system as claimed in claim 12, wherein the input signal estimator comprises M subcarrier input signal estimators in which a k-th subcarrier input signal estimator includes:

a phase rotation and evaluation device, for receiving the k-th time domain input signal and performing a 45-degree inverse phase rotation on the k-th time domain input signal so as to take the real part to thereby produce a real number input signal;

a first weighting device, connected to the first weighting device, for performing a weighting operation on the real number input signal based on a first weight factor to produce a first weight input signal; and an accumulator, connected to the first weighting device, for accumulating the first weight input signal respectively of a plurality of successive frames to produce the k-th estimative input signal, for $1 \leq k \leq M$.

17. The detection system as claimed in claim 16, wherein when the TPS input signals are transmitted in frequency domain, the first absolute maximum mask signal output by the first TPS decoder is greater than the second absolute maximum mask signal output by the second TPS decoder, and when the TPS input signals are transmitted in frequency domain, the second absolute maximum mask signal output by the second TPS decoder is greater than the first absolute maximum mask signal output by the first TPS decoder.

18. The detection system as claimed in claim 1, the detection is applied to a receiving system, the receiving system comprising:

an antenna for receiving a radio signal;

a radio frequency (RF) front end connected to the antenna for reducing the radio signal from a radio frequency down to a baseband to produce a baseband signal;

an analog to digital converter (ADC) connected to the RF front end for performing an analog to digital conversion on the baseband signal to produce an in-phase part and a quadrature-phase part;

a pre-synchronizer connected to the ADC for compensating ppm offset of the in-phase part and a quadrature-phase part;

a matched filter connected to the pre-synchronizer for performing a filtering to filter outband noises and produce a filtering signal;

a synchronizer connected to the matched filter for performing a system synchronization based on the filtering signal;

a channel estimator connected to the matched filter for performing a channel measurement on a transmission channel to produce a channel measure signal;

a frame body processor connected to the matched filter and the channel estimator for performing a frame body processing based on the channel measure signal produced by the channel estimator so as to eliminate interference introduced by a frame header and acquiring frame body for the followed FFT operation based on timing information provided by synchronizer;

a 3780-dot Fast Fourier Transform (FFT) connected to the frame body processor for performing an FFT operation on an output of the frame body processor to produce an unequalized frequency domain input signal;

a single tap equalizer connected to the 3780-dot FFT for performing equalization processing based on zero-forcing criteria on the unequalized frequency domain input signal to produce a frequency domain input signal; and a 3780-dot inverse FFT (IFFT) for performing an IFFT operation on the frequency domain input signal to produce a time domain input signal;

wherein the detection system, connected to the 3780-dot IFFT and the single tap equalizer, for determining the multi-carrier mode or the single-carrier mode based on the time domain input signal or the frequency domain input signal.

* * * * *